United States Patent [19]

Randall

[11] 4,393,730

[45] Jul. 19, 1983

[54] UNIDIRECTIONAL DETENT GATE

[75] Inventor: John R. Randall, La Palma, Calif.

[73] Assignee: McDonnell Douglas Corporation, Long Beach, Calif.

[21] Appl. No.: 209,733

[22] Filed: Nov. 24, 1980

[51] Int. Cl.³ ............................................. G05G 5/06
[52] U.S. Cl. ........................................ 74/538; 74/491
[58] Field of Search ................. 74/529, 491, 533, 535, 74/536, 537, 538, 471, 483

[56] References Cited

U.S. PATENT DOCUMENTS

| 2,594,927 | 4/1952 | Holt ........................................ 244/81 |
| 2,665,084 | 1/1954 | Feeney et al. ........................ 244/42 |
| 3,222,949 | 12/1965 | Peterson ............................... 74/471 |
| 3,648,538 | 3/1972 | Sammarco et al. ................... 74/491 |
| 3,710,644 | 1/1973 | Downing et al. ..................... 74/526 |
| 3,736,810 | 6/1973 | Fernandez ............................. 74/491 |
| 3,822,047 | 7/1974 | Schuldt, Jr. ........................ 244/77 D |

FOREIGN PATENT DOCUMENTS

| 456131 | 2/1928 | Fed. Rep. of Germany ........ 74/538 |
| 5533 | 5/1906 | France ................................. 74/535 |

*Primary Examiner*—Kenneth Dorner
*Attorney, Agent, or Firm*—John P. Scholl; George W. Finch; Donald L. Royer

[57] ABSTRACT

A unidirectional detent system for use with a flap handle to permit the setting of a variable stop for positioning of flaps for aircraft takeoff.

10 Claims, 7 Drawing Figures

UNIDIRECTIONAL DETENT GATE

BACKGROUND OF THE INVENTION

The present invention relates to a unidirectional detent gate for use on an adjustable aircraft flap handle quadrant.

In the past, fixed detents have been located on the flap handle quadrant to permit the pilot to set the flap handle to a specific position for actuation of the flaps to a setting, such as 10°, 20°, or 30° down. Adjustible detents for variable flap settings are known, for example see U.S. Pat. No. 3,710,644.

In newer aircraft, the flap controls are being designed to accomplish more sophisticated positioning and eliminate possible pilot error. With fixed flap detents, the pilot may not easily set the flap handle for the ideal flap position. The most efficient flap setting for aircraft takeoff varies depending upon a number of factors including aircraft load, center of gravity, temperature, altitude, wind, and runway length and condition.

When controls for selection of both adjustable and fixed detents are incorporated into a single handle it is possible to inadvertently select an incorrect flap position setting.

BRIEF SUMMARY OF THE INVENTION

The present invention permits the incorporation of both fixed and movable detent settings in a single flap handle and associated levers and helps to eliminate possible confusion in correctly selecting the proper detent. By the incorporation of the unidirectional detent gate on the movable detent crank, the movable flap detent position can only be activated by moving the flap handle in the downward direction. When the flap handle is in the up position and is rotated downward the detent gate on the movable detent lever opens and permits the pilot to select the takeoff flap position. If on the other hand, when the flaps are down and the flap handle is raised the unidirectional detent gate remains closed throughout the upward cycle, thus eliminating the possibility of selecting the takeoff flap position as the flaps are being raised.

It can be appreciated that by the inclusion of the unidirectional detent gate in the flap handle controls inadvertent selection of the takeoff flap position during raising of the flaps is eliminated.

DESCRIPTION OF THE PREFERRED EMBODIMENT

Figure 1:
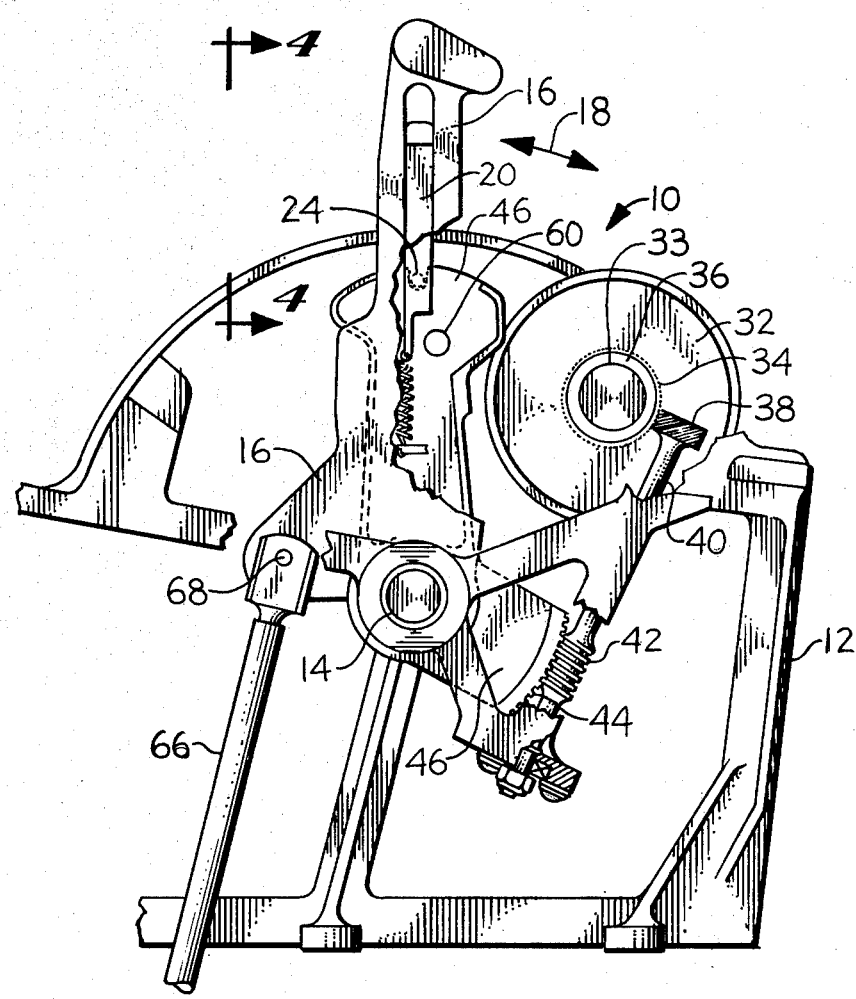
FIG. 1 is an elevation view of the flap quadrant frame, thumbwheel, adjustable gate lever, and flap handle.
Figure 4:
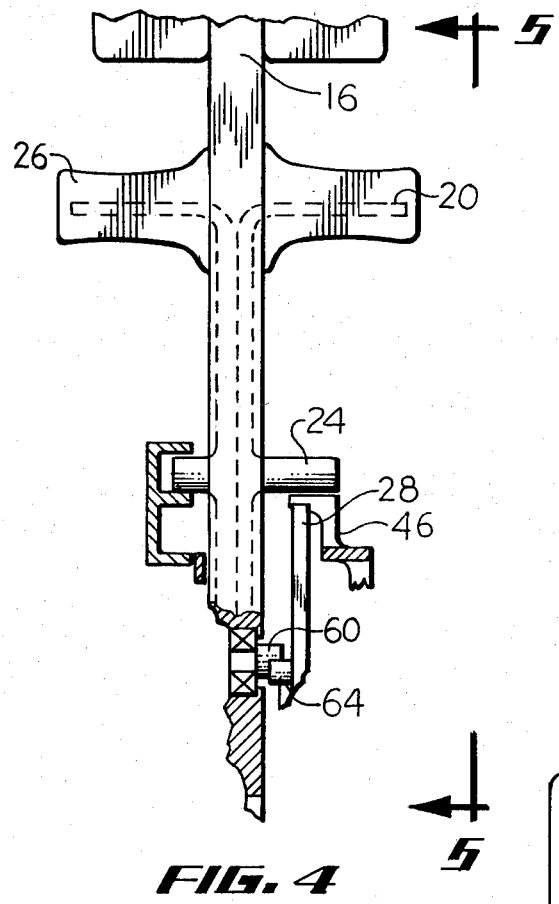
FIG. 4 shows an enlarged side elevation view along line 4—4 of FIG. 1.
Figure 5:
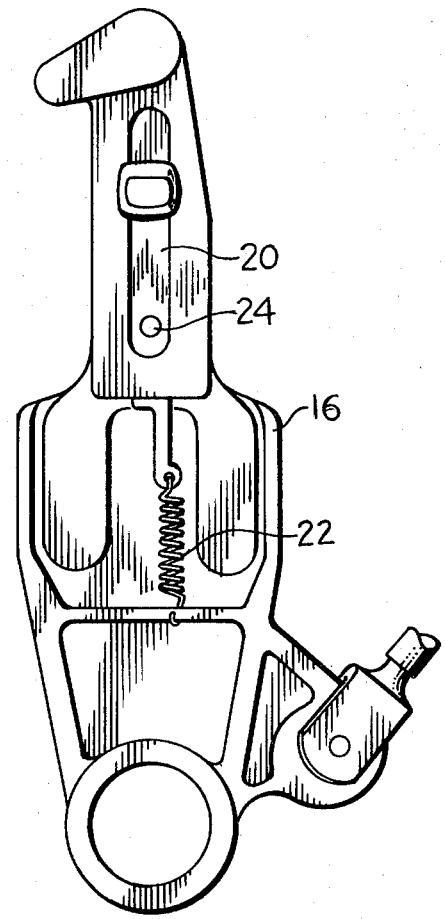
FIG. 5 is a side elevation along the line 5—5 of FIG. 4.

Referring to FIGS. 1, 4, and 5, the flap quadrant 10 consists of a frame 12 in which a bearing shaft 14 is mounted. The flap handle 16 is mounted for rotation on the bearing shaft 14. The flap handle 16 moves in a first plane in an arc defined by the double ended arrow 18. A right-hand flap lever 20 is slidably mounted in a track in the flap handle 16. The flap lever 20 is biased in a downward direction by coil spring 22 which is connected between the flap lever 20 and flap handle 16 (FIG. 5). Mounted on the right-hand flap lever 20 is a detent pin 24.

In FIG. 4, the left-hand flap lever 26 is used with fixed detent slots formed in the flap quadrant (not shown) for fixed settings, as for example, 10°, 20°, 30°, and 40° flap. The right-hand flap lever 20 is used in conjunction with the unidirectional detent gate on the movable crank with detent slot and is the subject of this invention.

Figure 2:
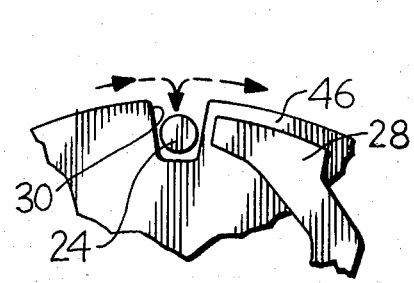
FIG. 2 shows the movement of the flap lever pin in the flap down direction, the detent gate having opened permits the flap detent pin to fall into the detent slot.

In FIG. 2, the movement of the detent pin 24 is shown with the flap handle (not shown) moving toward the flap down position. The detent gate or cover 28 is open, permitting the pin 24 to fall into the detent slot 30 for the adjustable takeoff flap setting.

Figure 3:
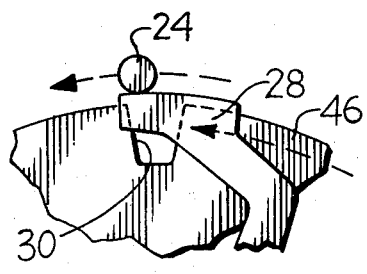
FIG. 3 shows the movement of the flap lever detent pin in the flap up direction, the detent gate is closed, forcing the detent pin to override the detent slot.

In FIG. 3, the flap handle is being moved to the flap up position, the detent pin 24 is moving across the detent slot 30 on the detent gate 28. The gate 28 is closed, preventing the detent pin 24 from falling into the detent slot 30 for takeoff flap setting.

Referring to FIG. 1, a thumbwheel 32 is rotatably mounted on the frame 12 on a second bearing shaft 33. Gear teeth 34 are formed on a hub 36 on thumbwheel 32. A worm shaft 40 is rotatably mounted in frame 12. Gear teeth 38 on worm shaft 40 engage teeth 34 on the thumbwheel hub 36. On the opposite end of worm shaft 40, second worm teeth 42 engage second gear teeth 44 on movable detent crank 46. Movable detent crank 46 is rotatably mounted on first bearing shaft 14 and moves in a second plane parallel to the plane of movement of the flap lever 16. By rotation of the thumbwheel 32, the movable detent crank 46 may be set.

Figure 6:
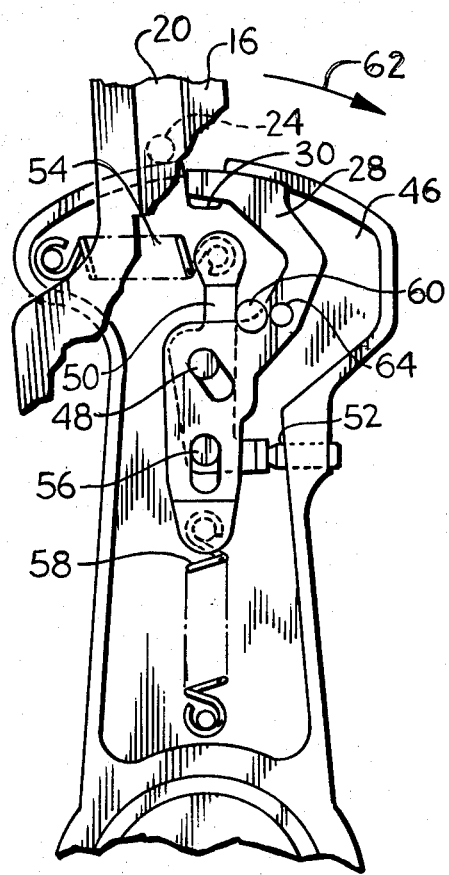
FIG. 6 shows the side elevation of the movable detent crank when the flap handle is being moved toward the flap down position just prior to the gate mechanism opening.

Referring to FIG. 6, on the top of the movable detent crank 46 is a detent slot 30. The movable detent crank 46 travels in an arc represented by double ended arrow 18 (FIG. 1). Mounted on the movable crank 46 (FIG. 6) is a first pivot peg 48 which is perpendicular to the plane of movement of the crank 46. A carrier 50 having a cylindrical hole therein is mounted for rotation on the first pivot peg 48. One end of the carrier engages an adjustable stop 52. This stop 52 prevents rotation of the carrier in a first counterclockwise direction. Rotation of the carrier 50 in the second clockwise direction is restrained by coil spring 54. Adjustable stop 52 is used to control the position of detent gate 28 with respect to detent crank 46 and particularly detent slot 30 therein.

Mounted on the carrier 50 is a second pivot peg 56 which is perpendicular to the plane of movement of crank 46 and parallel to the first pivot peg 48. A detent gate 28, having two slots therein, is mounted on the first 48 and second 56 pivot pegs for vertical and rotational movement. A second coil spring 58 biases the detent gate 28 against rotation and vertical movement.

On flap handle 16 is a bearing mounted roller 60 which projects perpendicularly from the plane of movement of the flap handle 16 (FIG. 4). As the flap handle 16 is moved to the rear in the direction of arrow 62 (FIG. 6) to activate the flaps in a downward direction, roller 60 engages pin 64 on the detent gate 28. With further movement of the flap handle 16 to the down position, the roller 60 pushes the pin 64 and gate 28 in the direction of arrow 62 (FIG. 6) opening the detent gate 28 enabling detent pin 24 to drop into the open detent slot 30.

If it is desired to move the flaps to a further down position, detent pin 24 may be raised out of detent slot 30 by raising detent lever 20 against the bias of coil spring 22, and the flap handle 16 may then be moved further down in the direction of arrow 62. As the flap handle continues downward, the roller 60 bypasses over the pin 64 on the gate 28, and the spring loaded gate 28 moves to close the detent slot 30.

Figure 7:
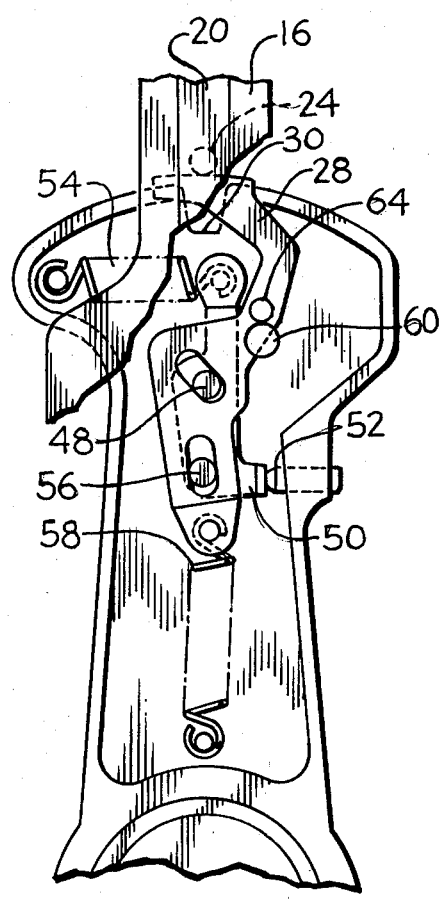
FIG. 7 is similar to FIG. 6. The flap handle is being moved toward the flap up position and the detent gate is in the closed position.

When the flap lever 16 is moved upward from a down position (FIG. 7), in a direction opposite arrow 62, it is desirable to have the movable takeoff detent slot 30 covered to prevent the flap lever 16 inadvertently stopping in the takeoff flap position. Movement of the flap handle 16 in the flap up direction (FIG. 7) causes the roller 60 on the flap handle 16 to engage the backside of pin 64. With further movement of the flap handle 16 in the up direction, roller 60 forces the detent gate 28 upward in a closed direction and prevents the detent pin 24 from entering into the detent slot 30. Once the detent pin 24 rides across the closed detent gate 28 past the detent slot 30, the roller 60 slides under the pin 64 and the gate 28 moves to its original spring loaded down and closed position (FIG. 6). The gate can now be opened again if the flap handle 16 is moved downward in the direction of arrow 62.

In FIG. 1, the mechanism for actuation of the flaps is movable rod 66 which is attached by a pivot pin 68 to flap handle 16. Rod 66 is connected thru other rods and lever (not shown) to the aircraft flaps.

To activate the flaps for takeoff, the pilot first computes on a separate chart the ideal takeoff flap setting. This setting is then adjusted on thumbwheel 32 and thru gearing and worm shaft 40 adjusts detent crank 46 and detent slot 30 to the ideal takeoff position.

The pilot then lowers flap handle 16. The movement of flap handle 16, in a downward direction, opens detent gate 28 and coil spring 22 pulls detent lever 20 downward and detent pin 24 falls into detent slot 30. After takeoff, the pilot can raise detent lever 20, against the bias of spring 22, which moves pin 20 out of slot 30 and then pilot may move flap flap handle to the up or down position.

While certain exemplary embodiments of this invention have been described above and shown in the accompanying drawings, it is to be understood that such embodiments are merely illustrative of, and not restrictive on, the broad invention to the specific desire to be limited in my invention to the specific constructions or arrangements shown and described, since various other obvious modifications may occur to persons having ordinary skill in the art.

What is claimed is:

1. An adjustable unidirectional detent gate system to provide variable flap settings comprising:
   a frame member;
   a bearing shaft mounted on said frame member;
   a flap handle mounted on said shaft for rotation in a first plane;
   a movable pin mounted on said flap handle perpendicular to said first plane;
   a crank mounted on said shaft for rotation in a second plane parallel to said first plane, said crank having a detent slot in periphery thereof;
   gear means attached to said frame engaging said crank to rotate said crank member in said second plane; and
   movable gate means attached to said crank to cover said detent slot on said crank, said gate means opening in response to movement of said flap lever in a downward direction to admit said movable pin on the flap handle to said detent slot and said gate closing over said detent slot when the flap handle is moved in an upward direction.

2. The adjustable unidirectional detent gate system of claim 1 wherein said movable gate means comprises:
   a retractable spring biased gate cover overlying said detent slot.

3. The adjustable unidirectional detent gate system of claim 2 wherein said retractable gate cover is rotatable between an open and closed position and spring biased to the closed position.

4. The unidirectional detent gate system of claim 3 wherein said retractable gate cover is mounted on a pivot peg attached to said crank and opens in a single direction.

5. The unidirectional detent gate system of claim 4 wherein said flap handle has a roller mounted thereon said roller engaging a pin located on said gate cover to open or close said gate cover in response to movement of said flap handle.

6. A unidirectional gate for a slot in the periphery of a base comprising:
   a pivotable carrier mounted on said base, said carrier pivotable in a single direction;
   first spring means biasing said carrier against rotation;
   a retractable cover mounted for rotation and translation on said base and said carrier; and
   second spring means biasing said cover over said slot against rotation and translation.

7. The unidirectional gate of claim 6 having a first pivot peg on said base wherein said carrier is mounted on said first pivot peg for rotation in a plane parallel to said base.

8. The unidirectional gate of claim 7 having a second pivot peg mounted on said carrier wherein said cover is mounted on said first pivot peg and said second pivot peg for rotation and translation in a plane parallel to said base.

9. The unidirectional gate of claim 8 wherein said first spring means is a coil spring interconnected between said cover and said base.

10. A unidirectional gate for a detent slot on the periphery of a base activated by a roller moving in a first plane comprising:
   a first pivot peg mounted on said base member perpendicular to said first plane;
   a carrier mounted on said first pivot peg for rotation in a first direction in a second plane parallel to said first plane;
   spring means attached to said base and said carrier restraining rotation of said carrier in a first direction, said carrier rotation in the second direction opposite said first direction limited by a stop located on said base member;

second pivot peg mounted on said carrier perpendicular to said first plane and parallel to said first pivot peg;

a cover having two slots therein mounted on said first and second pivot pegs for rotation and for vertical movement;

second spring means attached to said cover and to said base to restrain rotation and vertical movement of said cover; and a pin mounted on said cover, perpendicular to said first plane, to engage said roller in a first arc to move said cover and expose said detent slot, and when said roller engages the said pin in a second arc opposite said first arc, the roller forces the gate closed, providing a bridge over the detent slot.

* * * * *